(12) United States Patent
Sibon (10) Patent No.: US 11,093,888 B1
(45) Date of Patent: *Aug. 17, 2021

(54) ON-DEMAND DESIGNATED DELIVERY LOCATOR

(71) Applicant: Amazon Technologies, Inc., Seattle, WA (US)

(72) Inventor: Mark Daniel Sibon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,913

(22) Filed: Apr. 13, 2020

Related U.S. Application Data (63) Continuation of application No. 16/101,756, filed on Aug. 13, 2018, now Pat. No. 10,628,780, which is a continuation of application No. 14/860,215, filed on Sep. 21, 2015, now Pat. No. 10,078,808.

(51) Int. Cl.
*G06Q 10/08* (2012.01)
*B64C 39/02* (2006.01)

(52) U.S. Cl.
CPC ......... *G06Q 10/083* (2013.01); *B64C 39/024* (2013.01); *B64C 2201/128* (2013.01)

(58) Field of Classification Search
CPC ............... G06Q 10/083; B64C 39/024; B64C 2201/128
See application file for complete search history.

(56) References Cited

U.S. PATENT DOCUMENTS

| | | |
|---|---|---|
| 2014/0032034 A1 | 1/2014 | Raptopoulos et al. |
| 2015/0301150 A1* | 10/2015 | Stuckman .......... G06Q 10/0835 342/407 |
| 2015/0317597 A1 | 11/2015 | Shucker et al. |
| 2016/0068264 A1 | 3/2016 | Ganesh et al. |
| 2016/0300187 A1 | 10/2016 | Kashi et al. |
| 2016/0342934 A1 | 11/2016 | Michalik |

OTHER PUBLICATIONS

Office Action for U.S. Appl. No. 16/101,756, dated Sep. 3, 2019, Sibon, "On-Demand Designated Delivery Locator", 6 pages.

* cited by examiner

*Primary Examiner* — Marthe Y Marc-Coleman
(74) *Attorney, Agent, or Firm* — Lee & Hayes, P.C.

(57) ABSTRACT

Delivery area guidance may be provided to an unmanned aerial vehicle (UAV) delivering a package to a customer. For example, a UAV may be programmed to fly to a delivery area. When the UAV approaches the delivery area, the UAV may send a signal that it has a package for the customer. A delivery area guidance (DAG) device associated with the customer may receive the signal and project a visible landing marker to guide the UAV to a designated delivery location. The DAG device may monitor motion near the designated delivery location, indicate existence of obstacles, and/or notify inhabitance of the approach of the UAV and/or receipt of the package.

20 Claims, 8 Drawing Sheets

ON-DEMAND DESIGNATED DELIVERY LOCATOR

RELATED APPLICATIONS

This application is a continuation of, and claims priority to, U.S. patent application Ser. No. 16/101,756, filed on Aug. 13, 2018, now known as U.S. Pat. No. 10,628,780, issued on Apr. 21, 2020, which claims priority to and is a continuation of U.S. patent application Ser. No. 14/860,215, filed on Sep. 21, 2015, now known as U.S. Pat. No. 10,078,808, issued on Sep. 18, 2018, the entire contents of which are incorporated herein by reference.

BACKGROUND

The electronic commerce (E-commerce) industry has grown significantly in recent years, as many consumers have recognized the Internet as a preferred source of making commercial purchases due to the convenience of having orders delivered directly to a home or place of business. Currently, the majority of deliveries are conducted manually by delivery personnel going door-to-door. However, the unmanned aerial vehicle (UAV) has great potential as an expedient and energy efficient vehicle for delivering goods to the consumer. For example, after processing an order for a product, a UAV may be loaded with the product as cargo and it may fly to a delivery location, such as a consumer's home or office.

Traditionally, UAVs are provided guidance on how to maneuver in a delivery environment. For example, many UAVs are guided, via a signal from a remote operator, on an approach to a specific spot for landing. For UAVs carrying cargo, delivery guidance may be necessary for obstacle avoidance and the successful delivery of the cargo.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure provides methods, apparatuses, and systems for providing delivery area guidance to an unmanned aerial vehicle (UAV) delivering a package to a destination associated with a customer. For example, a UAV may be programmed to fly to a delivery area (e.g., a neighborhood, a block, or other area associated with the customer). Approaching the delivery area, the UAV may send a signal indicating that it is carrying a package for the customer. A delivery area guidance (DAG) device associated with the customer may receive the signal and activate a landing signal to guide the UAV to a delivery location. The landing signal may be a laser-based signal emitted on a location designated for landing.

In various embodiments, communications between the UAV and the DAG device may be encoded. For example, a signal communicated via a laser, a transmitter, and/or other communication hardware may be encoded by pulsing a customer-specific code, varying wavelengths, varying frequencies, or combinations of the foregoing. In some embodiments, the signal may be further encoded by varying rates of the pulsed code, variable wavelength and/or variable frequencies. The signal can provide the UAV with verification that the signal is being transmitted from a DAG device associated with the customer, to prevent fraud or spoofing.

In some embodiments, the DAG device may guide the UAV by designating the delivery location with a laser. For example, the laser may designate a landing area of a predetermined size in the customer's property, such as in a backyard, as the delivery location. In various examples, the designation of the delivery location may include other information, such as an indication of a direction to approach the delivery location. An example, of a designation includes an arrow pointing to a designated landing area in the customer's backyard where the arrow indicates a direction of travel toward the designated landing area. The UAV may detect, fly to, and release the package within the area designated as the delivery location. The delivery location may be pre-programmed in the DAG device or it may be designated by the DAG device in real-time or just prior to landing by the UAV. Further, the delivery location may change locations, and may be determined based on motion and/or other factors, such as presence of people or animals, presence of obstacles, environmental factors (e.g., direction and speed of wind, sunlight, etc.), and so forth.

In various embodiments, the DAG device may comprise one or more sensors configured to detect the successful delivery of a package. In such embodiments, the DAG device may send a delivery confirmation message and/or imagery of the delivered package to the customer and/or a central delivery system confirming delivery.

In various embodiments, the DAG device may comprise one or more sensors to detect an obstacle in a flight path between the UAV and the delivery location. In such embodiments, the DAG device may send a second signal highlighting the obstacle for the UAV to avoid. In some embodiments, the obstacle information may be pre-programmed into the DAG device, and the second signal highlighting the obstacle may be activated upon initial communication with the UAV. In some embodiments, the DAG device may emit a laser or other marker to identify a location of an obstacle, such as by shining a laser on the obstacle itself.

In some embodiments, the DAG device may include one or more motion sensors (motion detectors) to detect an obstruction in or around the delivery location. In such embodiments, the DAG device may provide a warning to the UAV and/or the obstruction. For example, the DAG device may detect a person walking across the designated delivery location. The DAG device may activate a speaker, and emit an audible warning of the inbound UAV and/or activate a warning light to shine a warning. The DAG device may additionally or alternatively send the UAV a signal that it is not clear to deliver the package. After a pre-determined time, the DAG device may scan the area again, and if no obstruction is present, the DAG device may send a second signal to the UAV that it is clear to deliver the package.

The techniques and systems described herein may be implemented in a number of ways. Example implementations are provided below with reference to the following figures.

Figure 1:
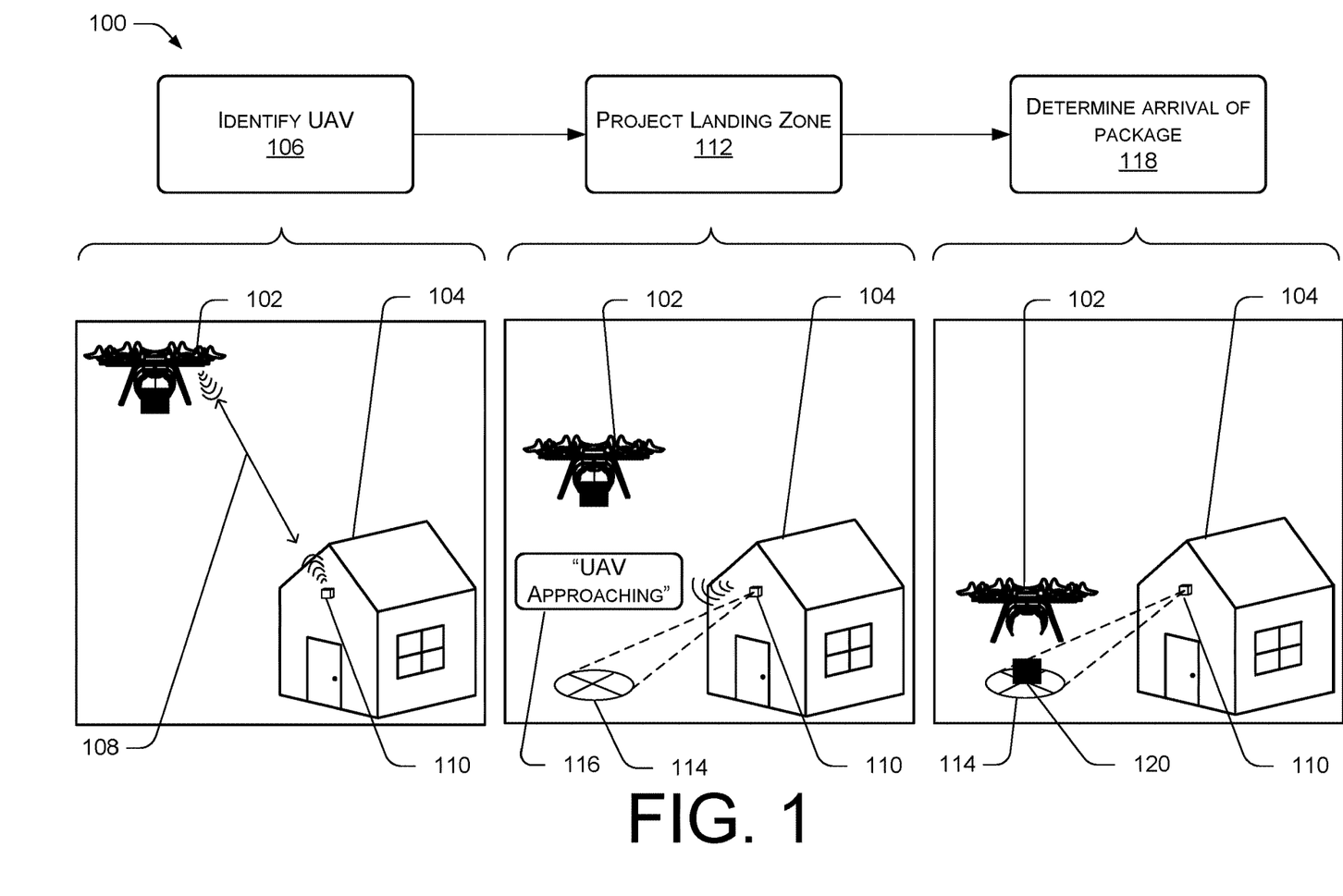
FIG. 1 is a pictorial flow diagram of an example process of an on-demand designated delivery location system.

FIG. 1 is a pictorial flow diagram of an example process 100 of a laser designated delivery location system. Some of the operations in the process 100 may be performed in parallel or possibly in a different order than the order shown in FIG. 1.

In various embodiments, the process 100 may apply to an unmanned aerial vehicle (UAV) 102 delivering a package to a destination 104 associated with a customer. In such embodiments, the UAV 102 may be programmed to fly to a waypoint associated with the customer. The customer waypoint may include a latitude, longitude and/or altitude in proximity of the destination 104 (e.g., a house, a place of business, etc.).

At 106, the UAV 104 may arrive at a customer waypoint and transmit a signal 108, which is received by a delivery area guidance (DAG) device 110. The signal 108 may activate the DAG device, such as to cause the DAG to switch from a passive mode to an active mode. In various embodiments, the signal 108 may include a customer code specific to the customer associated with the delivery (e.g., a customer number, an order number, a delivery number, QR code, etc.). The customer who purchased the item may not be a same person as the recipient of the package. Thus, the customer code may be specific to the customer associated with the delivery and/or the delivery location.

At 112, responsive to the initiating signal, the DAG device 110 may activate a projector to designate a delivery marker 114 (e.g., the area in which the UAV may deliver the package). In various embodiments, the projector may be a laser that emits a laser signal. The laser signal (or other projected signal) may be an encoded signal to prevent fraud or spoofing. The laser signal may be a pulsed signal, a variable frequency signal, a variable wavelength signal, or combinations of the foregoing. In some examples, the signal may pulse and or vary the wavelength and/or frequency at a variable rate. In some embodiments, the laser signal may include the customer code and/or other information specific to the customer and/or the delivery.

The UAV 102 may scan an area proximate to the destination 104 for the delivery marker 114 projected by the laser signal from the DAG device 110. In various embodiments, the UAV 102 may recognize the delivery marker 114, and verify the authenticity of the signal, such as, for example, by decoding an encoded signal. Upon recognition and verification of the laser signal designating the delivery location, the UAV 102 may begin an approach to the delivery marker 114.

In various embodiments, responsive to the initiating signal, the DAG device 110 may emit a warning 116 via one or more warning mechanisms. In some examples, the warning mechanisms may include a speaker, a light, a projector or other component capable of transmitting an audible or visual warning signal. For example, a speaker on the DAG device 110 may emit an audible warning of the UAV approaching, such as, "UAV approaching."

At 118, the UAV may approach the delivery location, and deliver a package 120. The UAV may lower the package 120, such as via a tether, drop the package 120, and/or land at the delivery location to release the package 120.

In various embodiments, the DAG device 110 may determine occurrence of a successful delivery, and may transmit a delivery confirmation message and/or image to a customer address/account and/or a central delivery system. The method of delivery confirmation may be pre-programmed in the DAG device 110 and/or a customer profile. For example, one customer may pre-program the DAG device 110 to send a text message to confirm delivery, while another customer may prefer an email.

Figure 2:
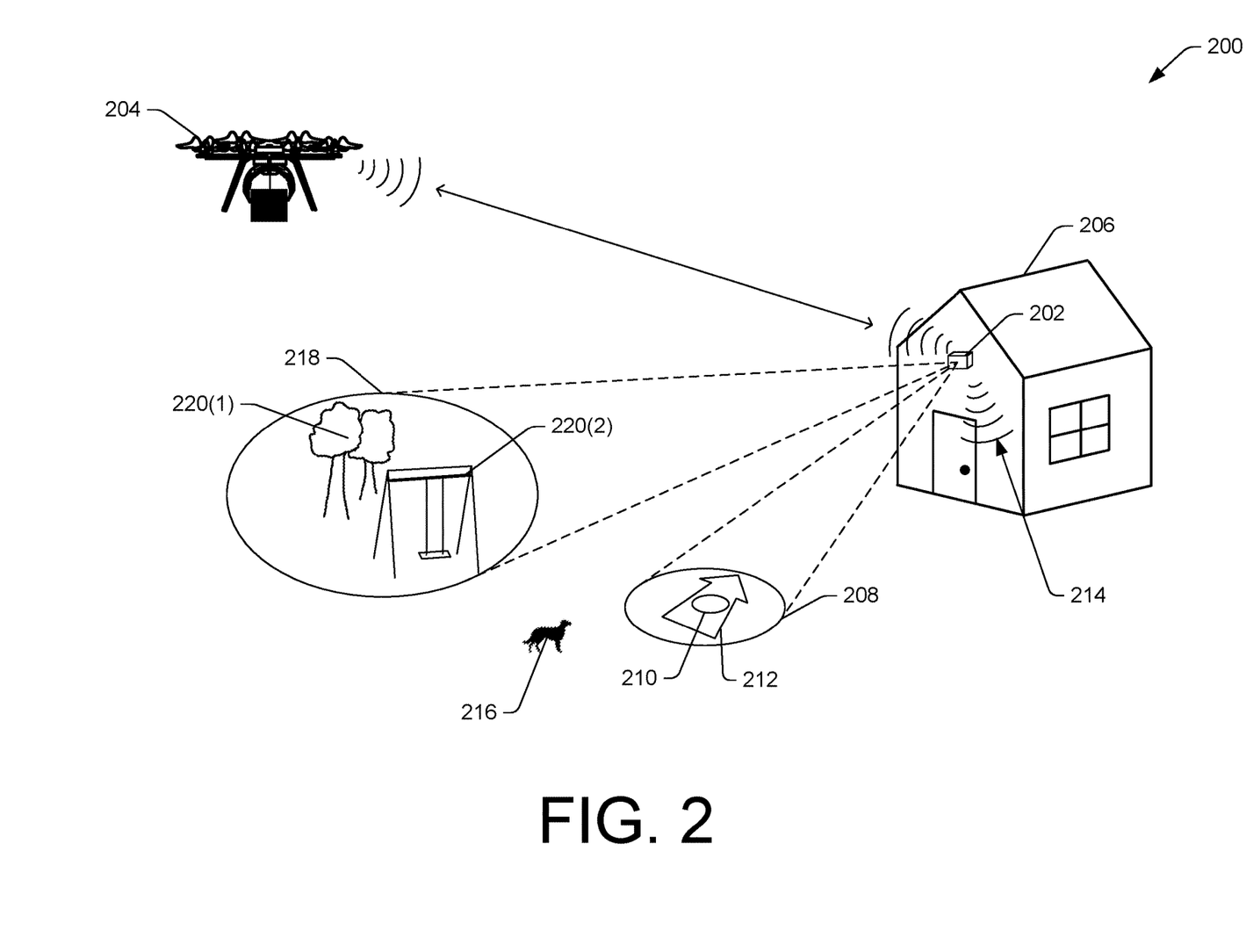
FIG. 2 is a schematic diagram showing an illustrative environment where a delivery area guidance device may provide landing and obstacle avoidance guidance to an unmanned aerial vehicle.

FIG. 2 is a schematic diagram showing an illustrative environment 200 in which a delivery area guidance (DAG) device 202 may provide landing guidance and obstacle avoidance guidance to an unmanned aerial vehicle (UAV) 204 in the delivery area.

In various embodiments, the DAG device 202 may be configured to an elevated structure, such as a side of a building. In other embodiments, the DAG device 202 may be configured to couple on a roof, on a gutter, on a fence railing, on a post, and/or another elevated surface As described above with respect to FIG. 1, the UAV 204 may be programmed to fly to a waypoint associated with the customer. The customer waypoint may include a latitude, longitude and/or altitude in proximity of a destination location 206. As depicted in FIG. 2, the destination location 206 may be a house. However, the destination location may also be a place of business, a designated neighborhood package delivery location, or another location designated by the customer for package delivery.

In various embodiments, upon arrival at or proximate to the customer waypoint, the UAV 204 may transmit an initiation signal to activate the DAG device 202 for delivery guidance. The initiation signal may include a customer code (e.g., customer identification, order number, a delivery number, quick response (QR) code, etc.), an order-specific code (e.g., order number, confirmation number, etc.), or another code specific to the DAG device 202 associated with the delivery.

In various embodiments, the DAG device 202 may remain in a passive mode (e.g., receive only) until it receives the initiation signal. The passive mode may be used to save power required by the DAG device. For example, a DAG device 202 operating on battery power may maximize the time in the passive mode to conserve battery power. In other embodiments, the DAG device 202 may remain in an active mode (e.g., transmit and receive). In such embodiments, the DAG device 202 may be connected to a constant power source (e.g., a plug, a solar panel, and the like). Responsive to receiving the initiation signal, the DAG device 202 may activate a laser and transmit a laser signal designating a delivery area 208 with a landing marker 210. The landing marker visual information 212, such as a directional guidance shape, a readable image, and/or other visual information.

In some embodiments, the DAG device 202 may receive an indication of a scheduled delivery from a central delivery system via a network (e.g., Wi-Fi, Bluetooth, mobile communications, cable, etc.). In such embodiments, the DAG device 202 may transition from a passive mode to an active mode at a pre-determined time prior to the scheduled arrival. For example, the DAG device may receive an indication from the central delivery system to expect a delivery at 11:30 am. At 11:15 am, the DAG device 202 may transition to an active mode, and may prepare to transmit the laser signal to designate the delivery area 208.

In various embodiments, the laser signal designating the delivery area 208 may be an encoded signal. The laser signal may be encoded by pulsing a customer code in as the landing marker 210, varying wavelengths of the projected landing marker, varying frequencies of the projected landing marker, and/or varying rates of the foregoing. In such embodiments, the UAV may be programmed to decode the projected landing marker, further verifying the correct delivery location and preventing fraud or spoofing.

In some embodiments, responsive to receiving an indication of an inbound UAV, the DAG device 202 may emit a warning 214. The warning 214 may an audible warning, a visual warning or both. In various embodiments, the type of warning may be dependent on the time of day. For example, during the daylight hours, an audible warning may provide an effective warning of an inbound UAV. However, at night, an audible warning in combination with a spotlight in the direction of the approaching UAV may provide an effective warning of the inbound UAV.

In various embodiments, the DAG device 202 may include a motion sensor to detect movement of an obstruction 216 at or proximate to the delivery location, such as a person or animal. Responsive to detecting the obstruction 216, the DAG device 202 may emit the warning 214. Additionally or alternatively, the DAG device 202 may send a message to the UAV 204 indicating that the delivery location is not clear to deliver the package. In some embodiments, the message may include instructions for the UAV 204 to fly a holding pattern or hover at a designated location close to the delivery location known to be free of obstacles. In other embodiments, the message may include a wave-off signal, and the UAV 204 may engage a missed approach programmed in a flight plan in the UAV.

In various embodiments, after a pre-determined interval with no motion at or proximate to the delivery area, the DAG device 202 may send a message to the UAV 204 that it is clear to deliver the package. In some embodiments, the DAG device 202 may wait a pre-determined time from the first detected motion, and may re-activate the motion detector. Responsive to no motion being detected upon re-activation, the DAG device may send the UAV 204 a message that the delivery location is clear of obstructions, and the UAV may approach to deliver the package.

In some embodiments, responsive to the detection of continuous or intermittent motion at or proximate to the delivery location 208, the DAG device 202 may send a message to the UAV 204 to return to a home base. Additionally or alternatively, the UAV 204 may initiate a return to the home base responsive to an internal indication. The internal indication may be based on having the power necessary to return to base and/or a recharging station. For example, the UAV 204 may be programmed with a maximum time on station. Responsive to the expiration of the maximum time on station, the UAV may depart the delivery area and fly directly to the base and/or the recharging station.

As depicted in FIG. 2, the DAG device 202 may include one or more projectors (e.g., lasers or other lights) configured to transmit an obstacle signal 218 of a no-fly zone (e.g., an area to avoid in flight). In various embodiments, the obstacle signal 218 may illuminate one or more obstacles 220, such as obstacles 220(1) and 220(2). In such embodiments, the obstacle signal 218 may transmit in a particular pulse, wavelength, and/or frequency to indicate to the UAV to avoid the area.

In some embodiments, the DAG device 202 may transmit to the UAV a waypoint associated with the obstacle 220 and/or an avoidance distance (e.g., a distance to remain away from the waypoint associated with the obstacle). In such embodiments, the transmission of the obstacle information may be via the laser signal designating the landing area, a second laser signal, a radio signal, a Wi-Fi signal, a Bluetooth signal, or any other signal compatible with the UAV 204. The UAV may receive the waypoint information, and may adjust a flight path a distance away from the waypoint associated with the obstacle.

In various embodiments, the DAG device 202 may have the obstacle information pre-programmed (possibly using user/customer input), and may illuminate the one or more obstacles 220 and/or may transmit obstacle avoidance information responsive to an indication of an inbound UAV. In some embodiments, the DAG device 202 may determine that the one or more obstacles 220 may be a factor in an approach path of the UAV to the delivery location. In response, the DAG device 202 may subsequently illuminate the one or more obstacles 220 and/or may transmit obstacle avoidance information. For example, the DAG device may recognize that a UAV is approaching from behind a playground. The DAG device may activate a second laser signal, indicating to the UAV to avoid the playground.

Figure 3:
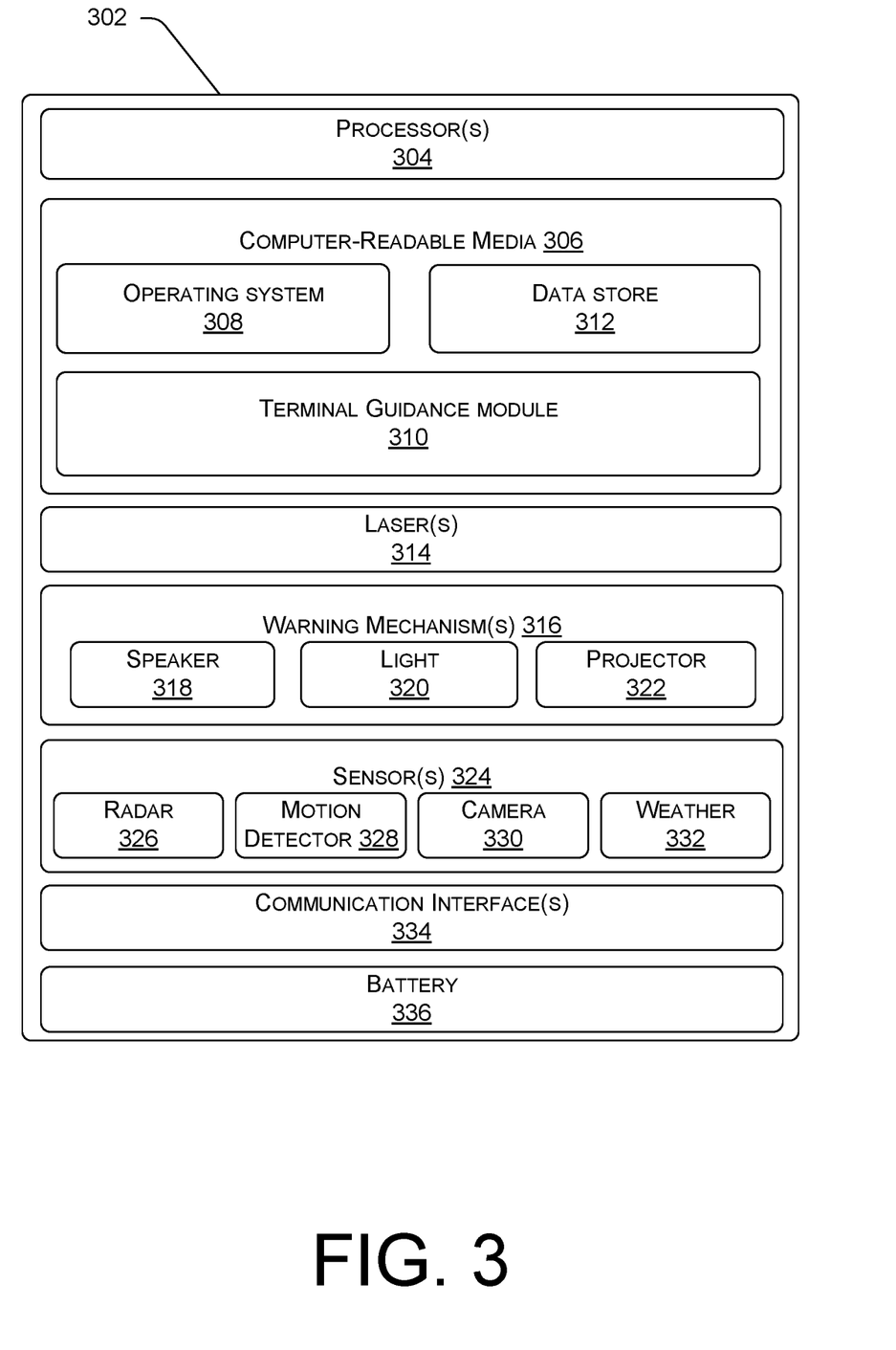
FIG. 3 is a block diagram of components of an example delivery area guidance device.

FIG. 3 illustrates an example delivery area guidance (DAG) device 302. In various examples, the DAG device 302 can provide the exemplary processes described with respect to FIGS. 1 and 2. The DAG device 302 may include one or more processor(s) 304 operably connected to computer-readable media 306. In some examples, the processor(s) 304 may be operably coupled to the computer-readable media 306 via one or more of a system bus, a data bus, an address bus, a PCI bus, a Mini-PCI bus, and any variety of local, peripheral and/or independent busses. Executable instructions stored on the computer-readable media 306 can include an operating system 308, a terminal guidance module 310, and other modules and programs that are loadable and executable by the one or more processor(s) 304. Examples of such programs or modules include, but are not limited to, delivery guidance algorithms, sensor algorithms, approach path analysis algorithms, network connection software, and control modules. In some examples, computer-readable media 306 can also include a data store 312 to store customer data (e.g., customer identification, customer preference data, etc.), delivery location data, scheduling data, and the like.

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit, as hardware, and/or as firmware. Typically, the functionality of the program modules may be combined or distributed as desired in various embodiments. An implementation of these modules and techniques may be stored on or transmitted across some form of computer-readable media.

In various examples, the terminal guidance module 310 may receive an initiation signal from an unmanned aerial vehicle (UAV) delivering a package, and may provide delivery guidance to the UAV. The terminal guidance module 310 may include logic to program one or more lasers 314 to transmit a signal indicating a delivery location. In various embodiments, the terminal guidance module 310 may encode the signal indicating the delivery location to prevent fraud, theft, or spoofing. In such embodiments, the signal may be encoded by pulsing a customer specific code, varying the wavelength of the signal, varying the frequency of the signal, and/or varying the rates of the foregoing.

In some embodiments, the delivery location may be a pre-determined location in proximity to the DAG device. In other examples, the delivery location may be determined real-time based on the size of the UAV, the size of the package, obstructions present in a pre-determined delivery location and/or other factors rendering a pre-determined delivery location unusable.

In various embodiments, the terminal guidance module 310 may include logic to program one or more warning mechanisms 316 to emit a warning of the inbound UAV. The one or more warning mechanisms 316 may include a speaker 318, a light 320, and/or a projector 322. For example, responsive to receiving the initiation signal from UAV, the terminal guidance module may emit an audible warning such as "UAV approaching."

In various embodiments, the terminal guidance module 310 may include logic to receive input from one or more sensors 324 indicating an obstruction at or proximate to the delivery location. The one or more sensors 324 may include a radar 326, a motion detector 328, a camera 330, and/or a weather sensor 332. In some embodiments, responsive to the input, the terminal guidance module 310 may transmit, via one or more communication interfaces 334, a warning signal to the UAV that it is not clear to deliver the package. In some examples, the warning signal may include instructions on where to hold, hover, or land until the delivery area is clear. In other examples, the UAV may have a pre-programmed location to hold, hover, or land in the event that an obstruction is present at the delivery area.

Additionally or alternatively, responsive to the input from the one or more sensors 324, the terminal guidance module may activate one or more warning mechanisms 316 to emit a warning of the inbound UAV. For example, the terminal guidance module may receive input from a motion detector, indicating that there is motion at or proximate to the delivery area, such as a person mowing the lawn at or proximate to the delivery area. Responsive to the input from the motion detector, the terminal guidance module may cause a speaker to emit an audible warning to clear the delivery area.

In some embodiments, the terminal guidance module 310 may include logic to program the one or more sensors 324 to monitor the delivery area to ensure the obstruction is no longer at or proximate to the delivery location. The one or more sensors 324 may observe the delivery location continuously for a pre-determined time interval, or momentarily after the pre-determined time interval has passed, to ensure the obstruction is no longer present. For example, a motion detector may observe the delivery location for 5 minutes, and responsive to a lack of motion detected during the 5 minute time interval, the terminal guidance module may transmit a message to the UAV that the delivery location is clear to deliver the package.

In some examples, responsive to an input that motion is detected in the area continuously or intermittently during the time interval, and/or is detected after the time interval has passed, the terminal guidance module 310 may transmit a message to the UAV indicating that the delivery location remains obstructed. The message may include an instruction to return to a base location, to fly to a re-charging station, or to continue to hold until a second time interval has passed. In some examples, the DAG device may be programmed to execute multiple iterations of time intervals until the obstruction is clear and/or the DAG device receives a signal from the UAV that the UAV is departing.

In various embodiments, the terminal guidance module 310 may include logic to program the one or more sensors 324 to detect an obstacle in an approach path of the UAV (e.g., flight path from an initial position of the UAV to the delivery area). In other embodiments, the terminal guidance module 310 may include one or more pre-programmed obstacles proximate to the delivery area. In still yet other examples, the terminal guidance module 310 may access obstacle information in the data store 312. In response to a determination that one or more obstacles is present in the approach path and/or proximate to the delivery area, the terminal guidance module 310 may cause the one or more lasers 314 to transmit a warning of the one or more obstacles.

Additionally or alternatively, responsive to the determination that one or more obstacles is present, the terminal guidance module 310 may transmit a warning, such as via the one or more communication interfaces 334, of an obstacle waypoint (e.g., latitude, longitude, and altitude) and/or distance (e.g., horizontal and/or vertical) to maintain away from the obstacle and/or the obstacle waypoint. The warning may be via a radio signal, a Wi-Fi signal, a Bluetooth signal, or any other signal for transmitting the information from the DAG device 302 to the UAV.

In various embodiments, the terminal guidance module 310 may include logic to program the one or more sensors 324 to monitor the delivery area for the successful delivery of the package. In various examples, the camera 330 may slew to the landing area, and may record a video and/or photographs of the UAV delivering the package. In some embodiments, the camera may be configured to read a bar code, a QR code, or another code printed on the package, in order to verify the delivery of the proper package (e.g., verify the package matches the customer's order).

In some embodiments, the terminal guidance module 310 may receive weather information from one or more weather sensors 332. The weather sensors 332 may provide the wind direction, wind magnitude, temperature, humidity, precipitation, and/or barometric pressure. Additionally or alternatively, the terminal guidance module 310 may receive weather information from an external source. For example, the terminal guidance module may receive wind direction and magnitude via a Bluetooth signal from an externally mounted weather vane. For another example, the terminal guidance module may receive local area weather information via a Wi-Fi signal from a website (e.g., a weather website, a central delivery system website, etc.).

As briefly described above, the DAG device 302 can include one or more communication interfaces 334 for exchanging messages with a UAV, a central delivery system, various customer devices, and other networked devices. For example, responsive to verifying the successful delivery of the package, the terminal guidance module 310 may send, via the one or more communication interfaces 334, a confirmation message to the customer and/or the central delivery system. For example, the DAG device 302 may send a delivery confirmation to the customer via text message. For another example, the DAG device 302 may send updated weather information to the approaching UAV, such as wind direction and magnitude.

The one or more communication interfaces 334 can include one or more network interface controllers (NICs), I/O interfaces, or other types of transceiver devices to send and receive communications over a network. For simplicity, other components are omitted from the illustrated device. In at least one embodiment, the one or more communication interfaces 334 receive the initiating signal from the UAV, and communicate the initiating signal to the terminal guidance module 310.

In various embodiments, the DAG device 302 may be powered by one or more batteries 336. Additionally or alternatively, the DAG device 302 may be connected to and powered by a power source (e.g., a power outlet, a solar panel, a wind generator, etc.). In some examples, the terminal guidance module 310 may be configured to monitor the status of the one or more batteries and/or the power source. In various embodiments, the terminal guidance module 310 may cause one or more warning mechanisms to emit an indication of a low battery and/or degraded power source. For example, the terminal guidance module 310 may cause a message to be sent to the customer using a communication type similar to or the same as one used to communicate arrival of a package.

In some embodiments, the terminal guidance module 310 may transmit, via the one or more communications interfaces, an indication to the customer and/or the central delivery system of the degraded power system and/or a low power available from the one or more batteries 336. For example, the terminal guidance module 310 may send the customer an email that the one or more batteries 336 are low. In various embodiments, the indication of the battery power may accompany a message of an upcoming scheduled delivery.

Figure 4:
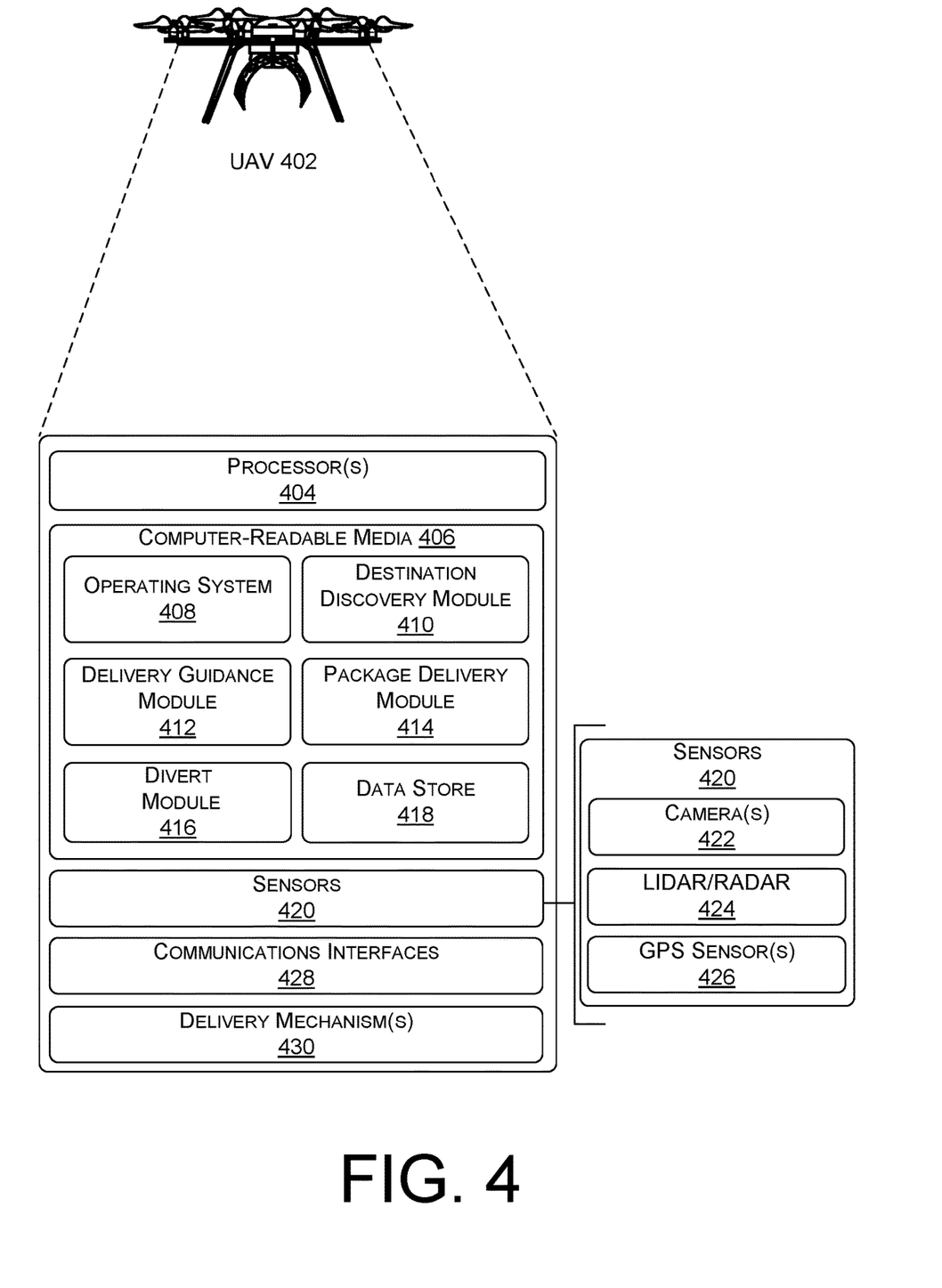
FIG. 4 is a block diagram of components of an example unmanned aerial vehicle that is supported by a delivery guidance system.

FIG. 4 illustrates an example unmanned aerial vehicle (UAV) 402 that is supported by the delivery guidance system. In various examples, the UAV 402 can correspond to the UAV 204. The UAV 402 may include one or more processor(s) 404 operably connected to computer-readable media 406. In some examples, the processor(s) 404 may be operably coupled to the computer-readable media 406 via one or more of a system bus, a data bus, an address bus, a PCI bus, a Mini-PCI bus, and any variety of local, peripheral and/or independent busses. Executable instructions stored on the computer-readable media 406 can include an operating system 408, a destination discovery module 410, a delivery guidance module 412, a package delivery module 414, a divert module 416, and other modules and programs that are loadable and executable by the one or more processor(s) 404. The computer-readable media 406 may also include software programs or other executable modules that may be executed by the one or more processor(s) 404. In some examples, computer-readable media 406 may also include a data store 418 to store customer data, delivery location data, flight plan data, scheduling data, and the like.

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit, as hardware, and/or as firmware. Typically, the functionality of the program modules may be combined or distributed as desired in various embodiments. An implementation of these modules and techniques may be stored on or transmitted across some form of computer-readable media.

In various embodiments, the UAV 402 may be equipped with one or more sensors 420 configured to assist in the delivery area guidance, and to monitor the operation and functionality of the UAV 402. The one or more sensors may include, but are not limited to, one or more cameras 422 (e.g., digital cameras, spectral cameras, thermographic camera, etc.), LIDAR/RADAR 424 (laser illuminated detection and ranging/radio detection and ranging), and a global positioning system (GPS) sensor 426. In various examples, the one or more sensors 420 may operate in conjunction with one or more modules in the computer-readable media 406, such as the delivery guidance module 412, the package delivery module 414, and/or the divert module 416, to assist in the successful delivery of a package.

In accordance with one or more embodiments, the destination discovery module 410 may receive data associated with a package. The data may include flight plan information (e.g., a series of waypoints including a waypoint associated with the customer and/or delivery location), a customer code (e.g., a customer number, an order number, a delivery number, QR code, etc.), delivery information (e.g., last known and/or preferred delivery location saved in customer profile), and the like. In some embodiments, the destination discovery module 410 may initiate flight to deliver the package based on the data.

In various embodiments, the computer-readable media 406 can include a delivery guidance module 412. In various examples, the delivery guidance module 412 may recognize a proximity to and/or an arrival of the UAV at a waypoint associated with the customer. Responsive to the recognition of the waypoint associated with the customer, the delivery guidance module 412 may transmit an initiating signal, such as that guidance depicted at 102 of FIG. 1. In some examples, the initiating signal may include a customer code in order to initiate communications with a DAG device specific to the customer and/or the order. The initiating signal may include a radio frequency signal, a Wi-Fi signal, a near-field communication signal, or any other signal compatible with the DAG device.

In various embodiments, the initiating signal may be transmitted via one or more communications interfaces 428 to enable communication between the UAV, the DAG device, and other networked devices, such as the central delivery system, a customer device, or other UAVs. The one or more communication interfaces 428 can include network interface controllers (NICs), I/O interfaces, or other types of transceiver devices to send and receive communications. For simplicity, other computers are omitted from the illustrated UAV 402.

In various examples, the delivery guidance module 412 may detect, via the one or more cameras 422, the laser designating the delivery location. In various embodiments, the laser signal designating the delivery location may be encoded. In such embodiments, the one or more cameras 422 may detect the encoded data from the laser signal, and send it to the delivery guidance module 412 to verify the DAG device and/or the delivery location matches the intended recipient of the package. For example, a camera providing the delivery guidance module with laser signal information may be configured to read a QR code embedded in the laser signal. The camera may send the QR code to the delivery guidance module to ensure a match with the QR code associated with the package.

In various embodiments, the delivery guidance module 412 may direct the UAV to fly toward the designated delivery location in order to deliver the package. In some examples, the delivery guidance module 412 may use input from the one or more cameras to direct an approach course to the designated delivery location.

In various embodiments, the one or more cameras 422 can be used to provide imaging for the UAV 402 during flight and/or in the delivery area, such as on the approach course to the designated delivery location. For example, the one or more cameras 422 can be used to provide real time still images or real time video of a delivery location.

Additionally, the LIDAR/RADAR 424 and/or the GPS sensor 426 may be configured to assist the UAV 402 in obstacle avoidance in the delivery area. In various examples, the LIDAR/RADAR 424 may provide detection, identification, and precision measurement of a distance to a delivery location. In various embodiments, the LIDAR/RADAR 424 may be used to provide navigation of the UAV 402, in conjunction with the one or more cameras 422 and/or the GPS sensor 426. For example, the LIDAR/RADAR 424 may detect an obstacle in an approach path, and may provide obstacle information (e.g., distance and bearing) to the delivery guidance module 412 to assist in avoiding the obstacle.

In some embodiments, the global positioning system (GPS) sensor 426 may provide delivery location, obstacle information, and time information to the UAV 402. In various examples, the UAV 402 may transmit the delivery location and time information, via one or more communication interfaces 428, to a central delivery system as a confirmation of delivery. In some examples, the UAV 402 may save the delivery location and time information locally, such as in the data store 418, and/or the delivery guidance module 412, to later upload to the central delivery system.

In various embodiments, the delivery location and/or obstacle information from the GPS sensor 426 may be saved to a customer profile in the data store 418, the delivery guidance module 412, the package delivery module 414 and/or the central delivery system. In such embodiments, a subsequent delivery UAV may be programmed to expect to deliver to the previous delivery location associated with the customer, and may be programmed to plan an approach to the delivery location to avoid any previously recognized obstacles.

In some embodiments, the computer-readable media 406 may include a package delivery module 414. In various examples, the package delivery module 414 may include instructions for package delivery. In some embodiments, the package delivery module may include instructions for the UAV 402 to land prior to releasing the package. In other embodiments, the package delivery module 414 may include instructions for the UAV 402 to hover over the delivery location, and lower the package, such as, from one or more tethers.

In various examples, the package delivery module 414 may receive an input from the one or more sensors 420 that the UAV 402 is stabilized at the delivery location (e.g., landed or in a stabilized hover). Responsive to an indication of stabilization at the delivery location, the package delivery module 414 may cause a delivery mechanism 430 to release the package. The delivery mechanism 430 may include one or more of a releasable clamp, a hook, a tether, a winch, a sliding door, a folding door, or any other mechanisms capable of securing a package to/in and releasing the package from the UAV 402.

In some embodiments, the package delivery module 414 may send, via the one or more communications interfaces 428, a message of successful delivery to the central delivery system. In some examples, the message of successful delivery from the package delivery module 414 may be compared to a message of successful delivery from a DAG device, further verifying the package was delivered to the correct location.

In various embodiments, the computer-readable media 406 may include a divert module 416. In various examples, the divert module 416 may include flight plan data to initiate upon successful delivery of a package and/or a message from the DAG device indicating that it is not clear to deliver the package. The flight plan data may include one or more of a flight plan to return to base, a flight plan to a nearby recharging station, a flight plan to a designated landing zone (e.g., designated place for UAV to land to save battery power at an idle power setting), a flight plan to a divert delivery area (e.g., a store designated to accept packages for customers in the area), or other flight plan data.

In some examples, the divert module 416 may monitor parameters of the UAV, and may determine an action to take (e.g., return to base, recharge, land, divert) based upon the parameters. For example, the DAG device may detect motion at or proximate to the delivery area, and may send a signal to the UAV that the delivery location is not clear for delivery. The divert module 416 may determine that there is insufficient battery power remaining to loiter at the delivery location. The divert module 416 may subsequently direct the UAV to fly to the nearest charging station to charge the battery prior to delivering the package.

Figure 5:
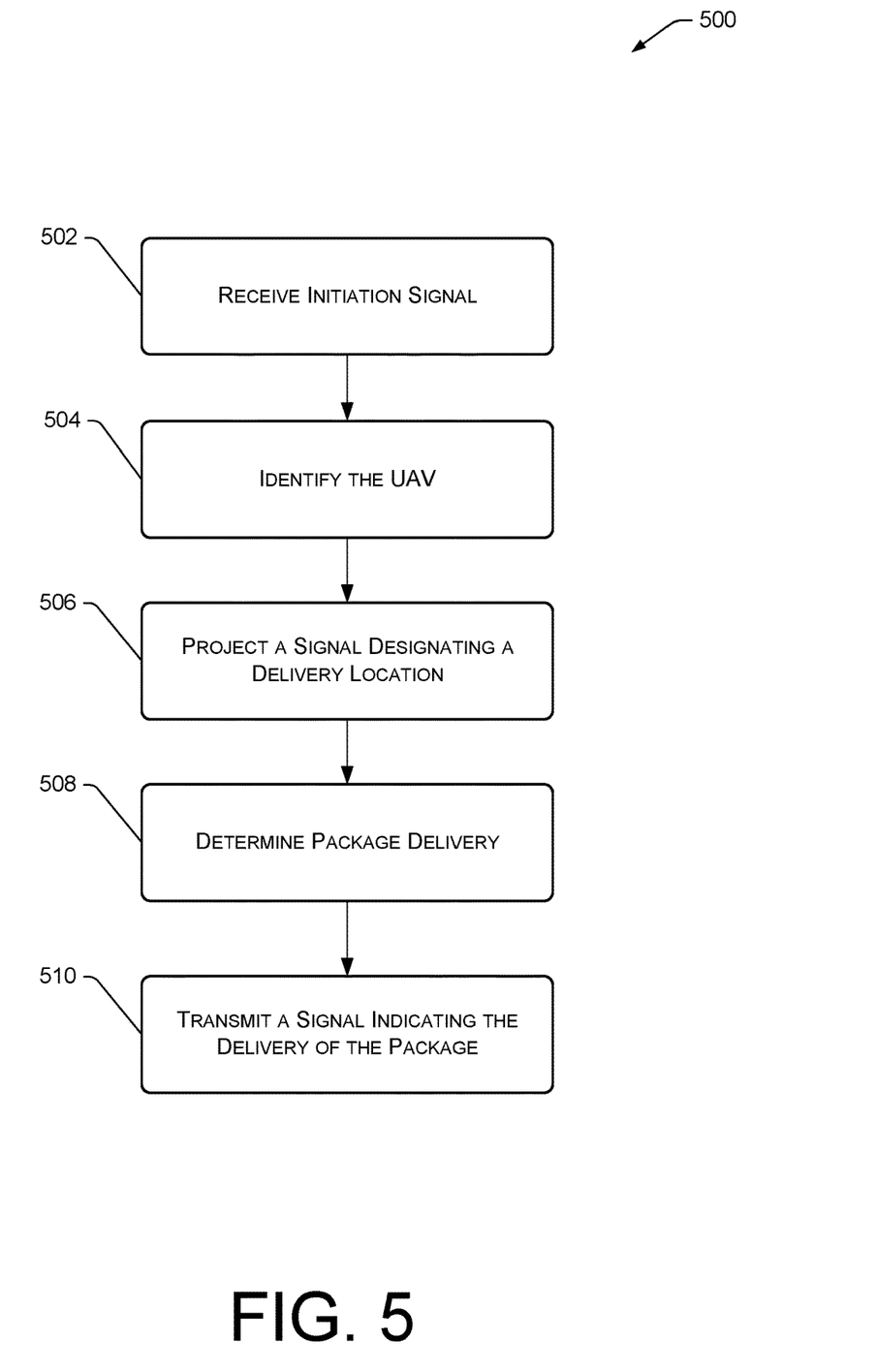
FIG. 5 is a flow diagram of an example process for providing delivery area guidance to an unmanned aerial vehicle.

FIG. 5 is a flow diagram of an example process for providing delivery area guidance to an unmanned aerial vehicle.

At 502, a delivery area guidance (DAG) device, such as DAG device 202, receives an initiation signal from an unmanned aerial vehicle (UAV). In some examples, the DAG device may receive the initiation signal via a transceiver. In various embodiments, the initiation signal can include a customer code, and/or a package code. Responsive to receiving the initiation signal, the DAG device may switch from a passive mode (e.g., energy saving mode) into an active mode.

For example, a UAV delivering a package may fly to a waypoint associated with house at which the UAV will deliver the package. At the waypoint, the UAV may transmit an initiation signal with a customer code associated with the house and the package. The DAG device at the house may receive the initiation signal and switch from a passive mode into an active mode.

At 504, the DAG device may identify the UAV based at least in part on the customer code and/or the package code. In some examples, a terminal guidance module in the DAG device may process the code in the initiation signal, and may match the customer code and/or the package code in the initiation signal with a customer code and/or a package code associated with the DAG device. The terminal guidance module in the DAG device may recognize the match as a valid identification of the UAV as an authorized delivery vehicle. Continuing the example from 502, the DAG device may receive the initiation signal, and may process the information transmitted in the initiation signal. The DAG device may recognize a match between a customer code transmitted in the initiation signal, and a customer code associated with the DAG device.

Responsive to identifying the UAV, the terminal guidance module in the DAG device may, at 506, activate a laser or other light projector and project a signal designating a delivery location via a delivery marker. In various examples, the delivery marker may be a circular, square, rectangular, or other shaped area that has been pre-determined to be a valid delivery area.

In various embodiments, the signal (which may be an image or visual marker) designating the delivery location may be encoded to prevent spoofing or fraud. In such embodiments, the terminal guidance module may encode the signal by pulsing the customer code and/or the package code in the signal, varying the wavelength of the signal, varying the frequency of the signal, and/or varying the rates of the foregoing. In some examples, the encoding may be based at least in part on the value of the package to be delivered. For example, a signal for a package having a value of less than $100 may have a code embedded in the signal, whereas a signal for a package having a value of greater than $1000 may have an embedded code, a variable wavelength, and a variable frequency.

In some examples, the signal designating the delivery location may include additional data. By way of example, and not limitation, the signal may include instructions on how to approach the delivery area, obstacle avoidance information, instructions to conduct a specific maneuver approaching the delivery area (e.g., fly to a waypoint south and approach the delivery area in a northbound direction), and the like. For example, the signal may designate a landing area on a balcony, and the additional instructions may include instructions on how to avoid an overhang of the balcony.

At 508, the DAG device may determine that the package has been delivered to the delivery location. In various examples, the DAG device may detect the package at the delivery location via one or more sensors, such as a camera and/or a radar. In some embodiments, the DAG device may verify the package is intended for the delivery location by scanning, via the camera, a code on the package. In such embodiments, the code may include a bar code, a QR code, or another code to identify the package and/or the intended delivery location.

At 510, responsive to verifying the package has been delivered to the delivery location, the terminal guidance module in the DAG device may transmit, via a transceiver, a signal indicating the delivery of the package (e.g., a delivery message). The delivery message may be sent to an intended recipient of the package, to a customer who purchased the package, a central delivery system, and/or any other person or entity programmed to receive the delivery message. In various embodiments, the delivery message may be sent via text, email, instant message system, or any other method of communicating messages between devices.

Figure 6:
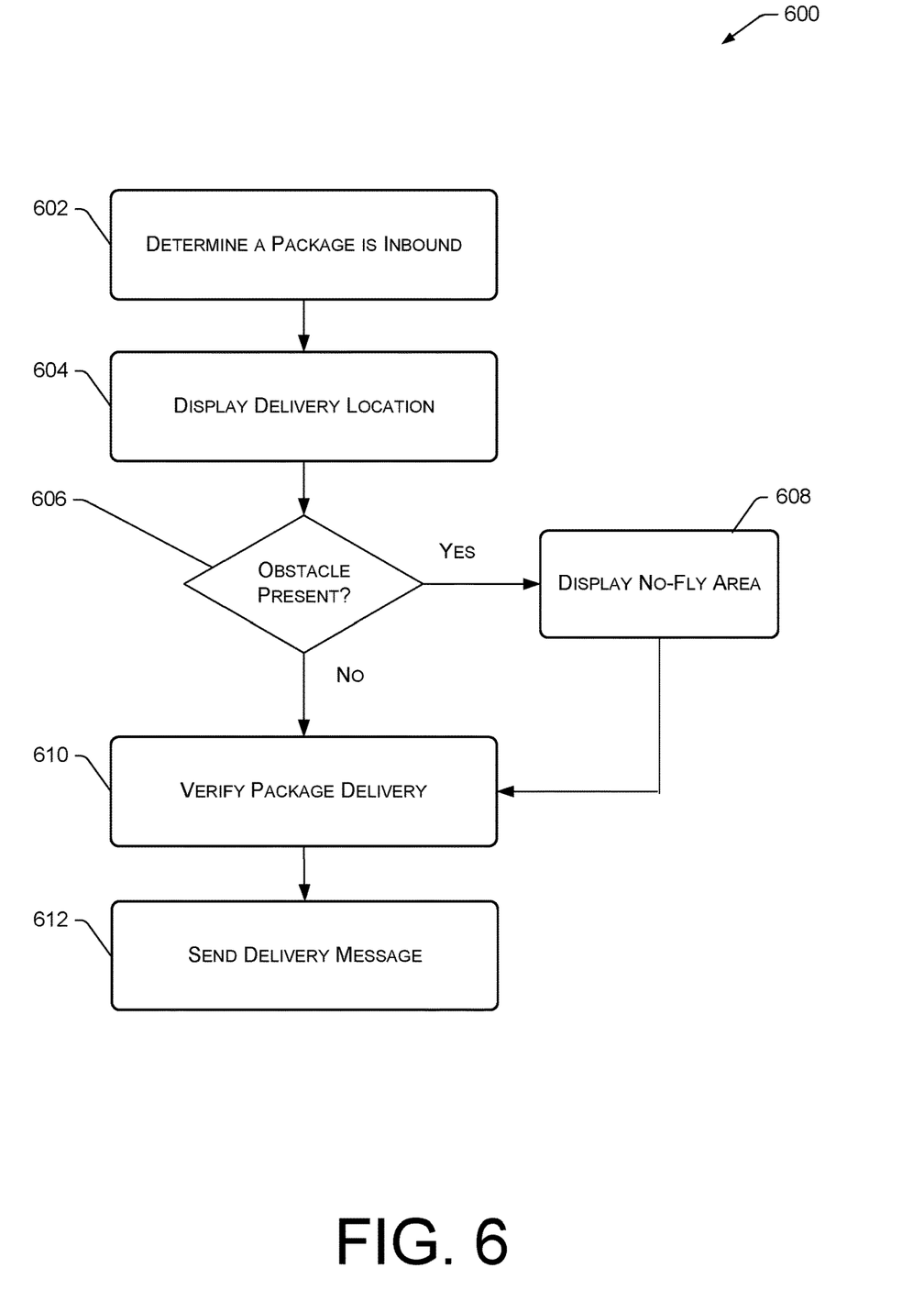
FIG. 6 is a flow diagram of an example process for providing delivery area guidance to an unmanned aerial vehicle.

FIG. 6 is a flow diagram of an example process for providing delivery area guidance to an unmanned aerial vehicle.

At 602, the DAG device may determine that a package is inbound. In some examples, the DAG device may determine that the package is inbound based on an initiation signal sent from an inbound UAV. In various embodiments, the initiation signal may include a customer and/or a package code matching a customer and/or package code programmed into a terminal guidance module of the DAG device. For example, the UAV may transmit a signal at a waypoint proximate to the DAG device. The signal may include a customer code matching a customer code programmed into the DAG device. Responsive to receiving the initiation signal with the customer code, the DAG device may switch from a passive mode (e.g., receive mode) to an active mode (e.g., transmit and receive mode).

In other examples, the DAG device may determine that the package is inbound by receiving a signal, via a communications interface, indicating the scheduled arrival of a UAV delivering a package. Responsive to the message, the DAG device may switch into an active mode at or near the time of the scheduled arrival time. For example, the DAG device may receive a message over a Wi-Fi connection indicating that a package is scheduled to arrive at 11:00 am. At 10:45, the DAG device may switch from a passive mode to an active mode.

At 604, the terminal guidance module in the DAG device may activate a laser and transmit a signal displaying a delivery location. In various embodiments, the delivery location may include a circular, square, rectangular, or other shaped signal recognizable by the UAV as the delivery location. In some embodiments, the signal displaying the delivery location may convey an approach direction. For example, the signal may include an arrow indication an approach path to the delivery location.

In some examples, the signal displaying the delivery location may be encoded. In such embodiments, the terminal guidance module in the DAG device may encode the signal by embedding the customer code and/or the package code, varying the wavelength of the signal, and/or varying the frequency of the signal. In some examples, the encoding may be based at least in part on the value of the package to be delivered. For example, a more expensive package may warrant a more heavily encoded signal, such as a signal with the customer code and with a variable wavelength.

In some examples, the signal designating the delivery location may include additional data. By way of example, but not limitation, the signal may include instructions on how to approach the delivery area, information about obstacles to avoid, instructions to conduct a specific maneuver approaching the delivery location, and the like. For example, the signal may designate a delivery location in a section of grass close to a fence, and the additional instructions may include instructions on how to approach the delivery location in order to avoid the fence.

At 606, the terminal guidance module may determine, via one or more sensors, the presence of an obstacle nearby the delivery location. In various examples, the obstacle may be recognized as an obstacle based at least in part on the location of the waypoint and/or an approach path of the UAV to the delivery area. In other examples, the obstacle may be a known obstacle proximate to the delivery location, and may be pre-programmed into the DAG device.

At 608, responsive to a determination that an obstacle is present, the DAG device may display a no-fly area. In various examples, a laser in the DAG device may illuminate the no-fly area with an obstacle signal. The obstacle signal may be an X pattern, a particular wavelength signal, or other signal capable of communicating to the UAV to not fly close the obstacle. For example, the laser may illuminate the obstacle with a red signal.

In some examples, the obstacle signal may include information regarding a distance and/or altitude to maintain from the obstacle. For example, a DAG device may recognize a playground close to the delivery location as an obstacle to an inbound UAV. The DAG device may illuminate the obstacle with a red signal, and embed information into the signal for the UAV to fly no closer than 10 feet in any direction from the playground.

At 610, the DAG device may verify that the package has been delivered to the delivery location. In various examples, the DAG device may detect the package at the delivery location via one or more sensors, such as a camera and/or a radar. In some embodiments, the DAG device may verify the package is intended for the delivery location by scanning, via the camera, a code on the package. In such embodiments, the code may include a bar code, a QR code, or another code to identify the package and/or the intended delivery location.

At 612, responsive to verifying the package has been delivered to the delivery location, the terminal guidance module in the DAG device may transmit, via a transceiver, a delivery message. The delivery message may be sent to an intended recipient of the package, to a customer who purchased the package, a central delivery system, and/or any other person or entity programmed to receive the delivery message. In various embodiments, the delivery message may be sent via text, email, instant message system, or other method of communicating messages between devices.

Figure 7:
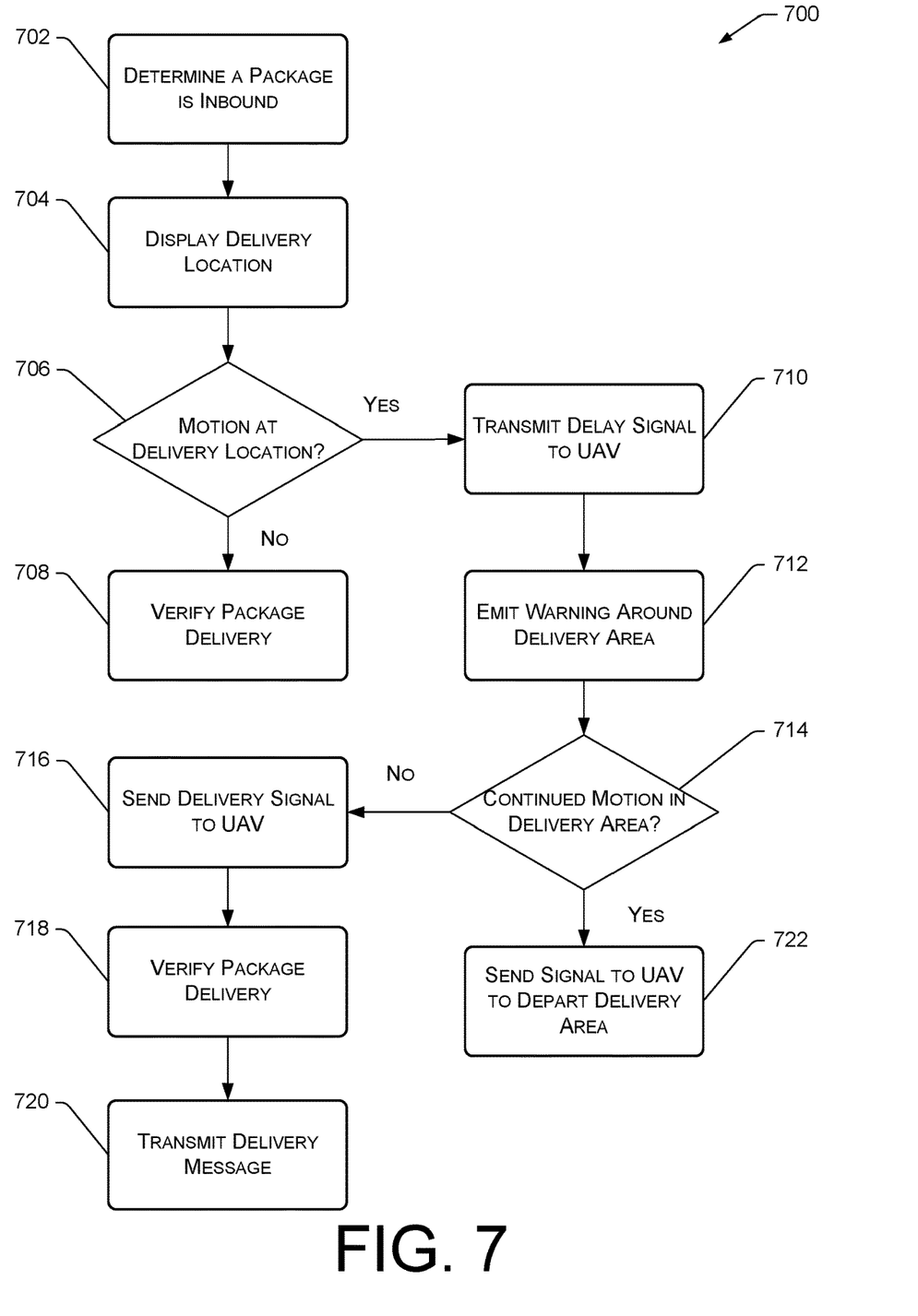
FIG. 7 is a flow diagram of an example process for providing delivery area guidance to an unmanned aerial vehicle.

FIG. 7 is a flow diagram of an example process for providing delivery area guidance to an unmanned aerial vehicle.

At 702, the DAG device may determine that a package is inbound. In some examples, the DAG device may determine that the package is inbound based on an initiation signal sent from an inbound UAV. In various embodiments, the initiation signal may include a customer and/or a package code matching a customer and/or package code programmed into a terminal guidance module of the DAG device. For example, the UAV may transmit a signal at a waypoint proximate to the DAG device. The signal may include a customer code matching a customer code programmed into the DAG device. Responsive to receiving the initiation signal with the customer code, the DAG device may switch from a passive mode (e.g., receive mode) to an active mode (e.g., transmit and receive mode).

In other examples, the DAG device may determine that the package is inbound by receiving a signal, via a communications interface, indicating the scheduled arrival of a UAV delivering a package. Responsive to the message, the DAG device may switch into an active mode at or near the time of the scheduled arrival time. For example, the DAG device may receive a message over a Wi-Fi connection indicating that a package is scheduled to arrive at 11:00 am. At 10:45, the DAG device may switch from a passive mode to an active mode.

At 704, the terminal guidance module in the DAG device may activate a laser and transmit a signal displaying a delivery location. In various embodiments, the delivery location may include a pre-determined circular, square, rectangular, or other shaped pattern recognizable by the UAV as the delivery location. In some examples, the signal displaying the delivery location may convey an approach direction. For example, the signal may include an arrow indication an approach path to the delivery location.

In some examples, the signal displaying the delivery location may be encoded. In such embodiments, the terminal guidance module in the DAG device may encode the signal by embedding the customer code and/or the package code, varying the wavelength of the signal, and/or varying the frequency of the signal. In some examples, the encoding may be based at least in part on the value of the package to be delivered. For example, a package including an expensive item may warrant a more heavily encoded signal, such as a signal embedded with the customer code and with a variable wavelength.

In some examples, the signal designating the delivery location may include additional data. By way of example, but not limitation, the signal may include instructions on how to approach the delivery location, information about obstacles to avoid, instructions to conduct a specific maneuver approaching the delivery location, and the like. For example, the signal may designate a delivery location in a section of grass close to a fence, and the additional instructions may include instructions on how to approach the delivery location in order to avoid the fence.

At 706, the DAG device may determine, via a motion detector, whether there is motion detected at or proximate to the delivery location. The motion may indicate the presence of an obstruction at or proximate to the delivery location.

At 708, responsive to no motion being detected at or proximate to the delivery location, the DAG device may verify that the package has been delivered to the delivery location. In various examples, the DAG device may detect the package at the delivery location via one or more sensors, such as a camera and/or a radar. In some embodiments, the DAG device may verify the package is intended for the delivery location by scanning, via the camera, a code on the package. In such embodiments, the code may include a bar code, a QR code, or another code to identify the package and/or the intended delivery location.

At 710, responsive to motion being detected by the motion detector, the DAG device may transmit, via a transceiver, a delay signal to the UAV. In various embodiments, the delay signal may include an indication that it is not clear to land. In some embodiments, the delay signal may include instructions, including but not limited to, an instruction to hover at a pre-determined waypoint and/or altitude, an instruction to hold in a pre-determined pattern and/or altitude, an instruction to return to base, etc.

At 712, responsive to motion being detected by the motion detector, the DAG device may emit a warning around an area associated with the delivery location. The warning may be an audible warning via a speaker, and/or a visual warning via a light and/or a projector. For example, responsive to detecting motion at the delivery location, the DAG device may transmit a warning saying "Caution, UAV approaching. Please clear the delivery area."

In some examples, the type of warning may be based at least in part on the time of day. For example, during the day, the warning may be an audible warning, and at night, the warning may include an audible warning and a visual warning, such as a flashing light.

At 714, the DAG device may determine, via a motion detector, whether there is continued motion detected at or proximate to the delivery location. In various embodiments, the DAG device may monitor for motion for pre-determined period of time after the warnings have been transmitted. In some embodiments, the DAG device may wait a pre-determined time interval after the warnings are transmitted, and may activate the motion detector to determine if the obstruction is still present at or proximate to the delivery location.

At 716, responsive to no motion being detected for a pre-determined period of time or after a pre-determined time interval, the DAG device may send a delivery signal to the UAV, indicating that the delivery location is clear for package delivery. For example, the DAG device may recognize that no motion has been detected for 5 minutes, and may send a signal to the UAV that it is clear to deliver. For another example, the DAG device may wait 5 minutes after transmitting the warnings, and may scan the delivery area for motion. Responsive to no motion being detected, the DAG device may send a delivery signal to the UAV.

At 718, the DAG device may verify that the package has been delivered to the delivery location. In various examples, the DAG device may detect the package at the delivery location via one or more sensors, such as a camera and/or a radar. In some embodiments, the DAG device may verify the package is intended for the delivery location by scanning, via the camera, a code on the package. In such embodiments, the code may include a bar code, a QR code, or another code to identify the package and/or the intended delivery location.

At 720, responsive to verifying the package has been delivered to the delivery location, the terminal guidance module in the DAG device may transmit, via a transceiver, a delivery message. The delivery message may be sent to an intended recipient of the package, to a customer who purchased the package, a central delivery system, and/or any other person or entity programmed to receive the delivery message. In various embodiments, the delivery message may be sent via text, email, instant message system, or any other method of communicating messages between devices.

At 722, responsive to detecting motion after the predetermined period of time or time interval after the warnings have been transmitted, the DAG device may transmit a signal to the UAV to depart the delivery area. In some examples, the signal to depart the delivery area may include an instruction to return to a base location (e.g., warehouse), a recharging station, a pre-designated neighborhood delivery location, or other pre-designated delivery location.

In various embodiments, the signal to depart the delivery area may be based on an indication of a battery life of the UAV. For example, the UAV may transmit a signal to the DAG device indicating that the UAV has 20 minutes of loitering time available (e.g., 20 minutes of time to remain at the delivery location to attempt to deliver the package). The DAG device may determine that, after 19 minutes, the obstruction is still present in the delivery area. Responsive to the determination, the DAG device may instruct the UAV to depart.

Figure 8:
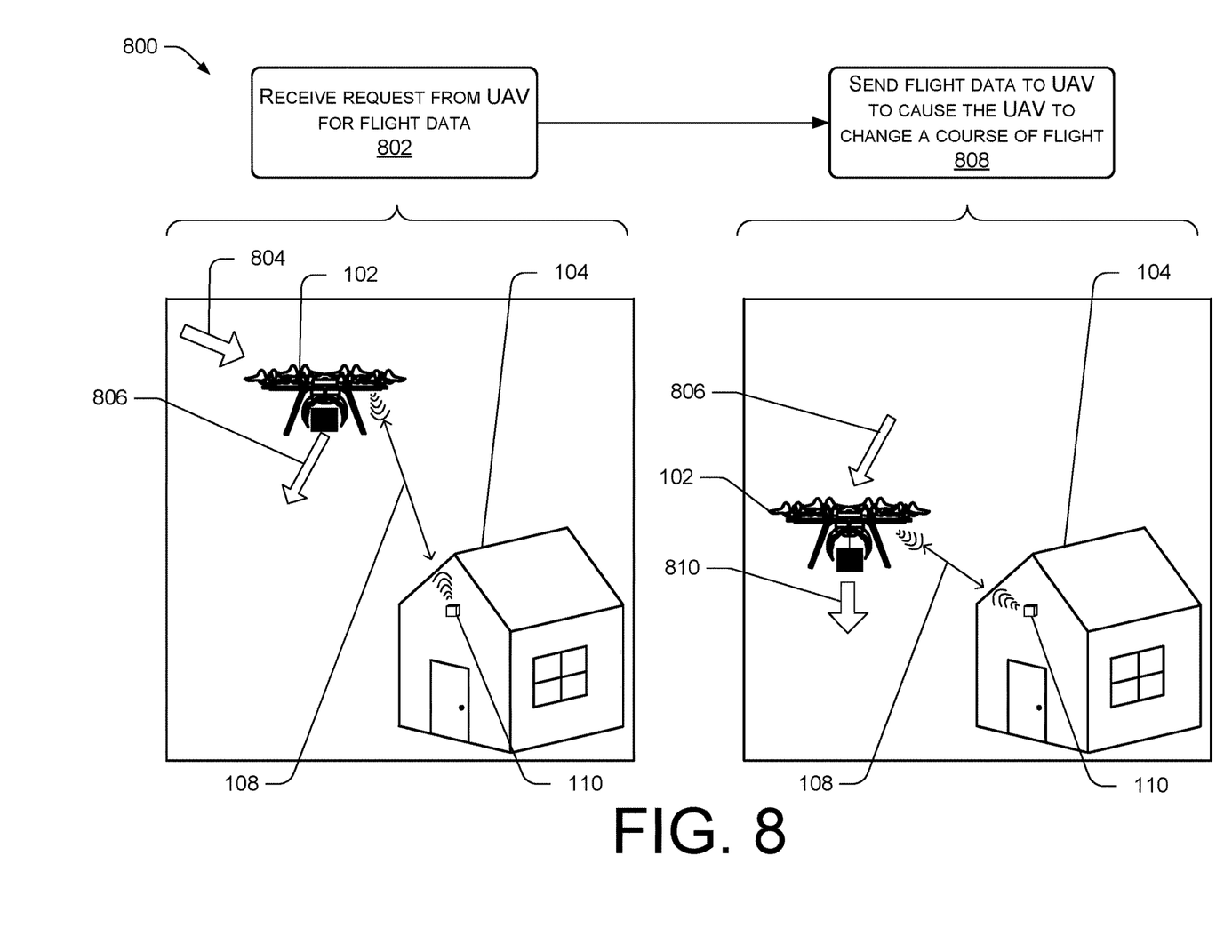
FIG. 8 is a pictorial flow diagram of an example process showing a delivery guidance device providing position information to an unmanned aerial vehicle.

FIG. 8 is a pictorial flow diagram of an example process 800 showing a delivery area guidance device providing position information to an unmanned aerial vehicle.

In various embodiments, the unmanned aerial vehicle 102 may request position information from the delivery area guidance (DAG) device 110 to assist the UAV 102 in successfully delivering a package. In some examples, the UAV 102 may use this information to navigate around and over the destination 104 (e.g., the customer's property, etc.) in accordance with predetermined rules and/or restrictions. The position information may be provided by communications 108, such as radio and/or optical communications, directly to the UAV 102, such as by exchange of information via transceivers. In some examples, the position information may be used in response to a recognition that an onboard navigation system (e.g., global positioning system (GPS), inertial navigation system (INS), etc.) is degraded. In other examples, the UAV 102 may be programmed to periodically request position information to ensure a correct route of flight.

At 802, the DAG device 110 may receive a request from the UAV 102, which may arrive via a first path 804 at a waypoint on a programmed flight plan and may transmit a signal indicating that the UAV request position information. In various embodiments, the signal may be transmitted in the direction of the programmed route of flight, so the UAV can locate a DAG device without deviating from course.

The position information may be one or more locations or waypoints 806 for the UAV to pass through to and/or to avoid, in order to deliver the package.

The position information may assist the flight of the UAV by providing specific and accurate data for a local area (area proximate to the destination 104). This information may provide identification of a landing zone, avoidance information about obstacles, weather information, and so forth, which may be marked by GPS data and/or otherwise indicated by communications sent to the UAV 102. In some instances, the UAV 102 flying on a flight plan may transmit a distress signal indicating severe weather, a problem with navigation, and/or an internal system. For example, a UAV that flies into heavy fog may send a distress signal to identify a DAG device close by that can assist the UAV with navigation and/or landing at a designated landing area.

In various embodiments, responsive to receiving the signal, the DAG device 110 may switch from a passive mode to an active mode. At 808, the DAG device 110 may transmit updated position data 810 to the UAV 102. The position data may include a latitude and longitude, or other grid coordinate system. The position information may enable the UAV to reach a next waypoint, may be the next waypoint, and/or may be a location to land or a location of an obstacle. In various embodiments, the UAV may update degraded navigational system with the new position data, and may continue on course to a programmed destination.

Additionally or alternatively, responsive to receiving a distress signal, the DAG device may provide updated position data, obstacle data, and/or landing guidance to the UAV.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. An unmanned aerial vehicle (UAV) guidance apparatus comprising:
   a transceiver;
   a laser;
   one or more processors; and
   one or more memories storing instructions executable by the one or more processors to perform acts comprising:
      determining that a UAV carrying an item is proximate to a delivery area;
      projecting a delivery marker at a delivery location associated with the delivery area; and
      transmitting a signal to a computing device to indicate arrival of the item.

2. The UAV guidance apparatus of claim 1, further comprising a speaker, the acts further comprising:
   emitting, via the speaker, audio to indicate an approach of the UAV toward the delivery location.

3. The UAV guidance apparatus of claim 1, further comprising at least one of a light detection and ranging (LIDAR) device or a radio detection and ranging (RADAR) device, the acts further comprising:
   determining, based at least in part on data from the at least one of the LIDAR device or the RADAR device, that an obstacle is proximate to an approach path of the UAV to the delivery area; and
   transmitting, via the transceiver, a warning signal to the UAV to avoid the obstacle.

4. The UAV guidance apparatus of claim 1, further comprising a light source, the acts further comprising:
   determining that a time associated with the arrival is between a first time associated with sunset and a second time associated with sunrise; and
   responsive to determining that the UAV is proximate to the delivery area, projecting, via the light source, a light in the delivery area, wherein the light is associated with providing a warning of the UAV approaching the delivery location.

5. The UAV guidance apparatus of claim 1, wherein the delivery marker comprises an encoded signal.

6. The UAV guidance apparatus of claim 1, further comprising a weather sensor, the acts further comprising:
detecting a wind speed and a wind direction; and
sending, via the transceiver and to the UAV, a weather signal to indicate the wind speed and wind direction.

7. A method comprising:
determining, by a device, that an unmanned aerial vehicle (UAV) carrying an item is proximate to a delivery area;
projecting a marker onto a surface to designate a delivery location associated with the delivery area;
verifying a delivery of the item; and
transmitting a signal to a remote device to indicate the delivery of the item.

8. The method of claim 7, further comprising:
determining that a time associated with the delivery of the item is between a first time associated with sunset and a second time associated with sunrise; and
responsive to determining that the UAV is proximate to the delivery area, projecting, via a light source of the device, a light in the delivery area, wherein the light is associated with providing a warning of the UAV approaching the delivery location.

9. The method of claim 7, further comprising:
determining that an obstacle is proximate to at least one of the delivery location or an approach path to the delivery location; and
projecting, via a light source of the device, an obstacle marker designating the obstacle for the UAV to avoid.

10. The method of claim 7, further comprising:
detecting, by a motion sensor of the device, motion proximate to the delivery location; and
responsive to detecting the motion, emitting, via a speaker of the device, audio to indicate an approach of the UAV toward the delivery location.

11. The method of claim 7, prior to verifying the delivery of the item at the delivery location, the method further comprising:
detecting, by a motion sensor of the device, motion proximate to the delivery location;
responsive to detecting the motion, emitting, via a transceiver of the device and to the UAV, a warning signal to indicate that the delivery location is not clear for the delivery of the item;
determining an absence of motion proximate to the delivery location for a pre-determined amount of time; and
transmitting, via a transceiver of the device and to the UAV, a delivery signal to indicate that the delivery location is clear for the delivery of the item.

12. The method of claim 7, further comprising:
identifying the item for delivery; and
encoding the marker based on an identification of the item.

13. The method of claim 7, further comprising:
detecting, by a weather sensor of the device, a wind speed and a wind direction; and
sending, via a transceiver of the device and to the UAV, a weather signal to indicate the wind speed and wind direction.

14. A system comprising:
one or more processors; and
memory coupled to the one or more processors, the memory including computer-executable instructions that, when executed by the one or more processors, cause the one or more processors to perform acts comprising:
determining that an unmanned aerial vehicle (UAV) carrying an item is proximate to a delivery area;
projecting a delivery marker at a delivery location associated with the delivery area; and
transmitting, to a remote computing device, a signal to indicate arrival of the item.

15. The system of claim 14, the acts further comprising:
monitoring a battery power associated with a light source for projecting the delivery marker;
determining that the battery power is below a threshold battery power; and
sending a low power message to the remote computing device to indicate that power available is below the threshold battery power.

16. The system of claim 15, the acts further comprising:
determining that a delivery of a second item is scheduled within a period of time; and
sending, to the remote computing device, an indication of the delivery of the second item concurrently with the low power message.

17. The system of claim 14, the acts further comprising:
determining an approach path of the UAV to the delivery location;
determining that an obstacle is proximate to the approach path of the UAV; and
projecting, via a laser of a delivery area guidance device, an obstacle marker designating the obstacle for the UAV to avoid.

18. The system of claim 14, the acts further comprising:
detecting at least one of a wind speed or a wind direction;
sending, via a transceiver of a delivery area guidance device and to the UAV, a weather signal to indicate the at least one of the wind speed or the wind direction; and
determining an approach path of the UAV based at least in part on the at least one of the wind speed or the wind direction.

19. The system of claim 14, the acts further comprising:
detecting motion proximate to the delivery location; and
responsive to detecting the motion, emitting audio to indicate an arrival of the UAV.

20. The system of claim 14, the acts further comprising:
identifying the item for delivery; and
encoding the delivery marker based on an identification of the item for delivery.

* * * * *